Figure 1:
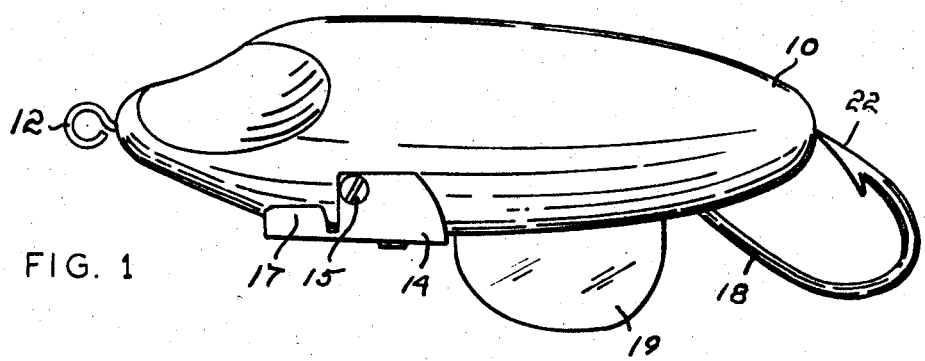

Feb. 3, 1959  D. G. FISHER  2,871,608
FISH LURES
Filed Oct. 17, 1956

INVENTOR.
DONALD G. FISHER
BY
ATTORNEY

2,871,608
FISH LURES
Donald G. Fisher, Petersham, Mass.

Application October 17, 1956, Serial No. 616,532

4 Claims. (Cl. 43—35)

The present invention relates to fish lures and has as its principal objective that of meeting the demand for fish lures that are effective in taking fish but whose hooks are effectively prevented from becoming fouled with weeds in use.

This objective is attained by providing a fish lure body with a slot extending therealong and through the rear end thereof. A permanent magnet is attached to the body, while a hook, attached either to the magnet or to the body, is movable between a first position in which its barb is shielded by the body into a second position in which the hook is operatively exposed. The permanent magnet releasably holds the hook in its first position until a fish strike causes the hook to be operatively exposed. To effect this result, the hook is provided with an actuating part that protrudes from the slot in the first hook position to be engaged and moved by the force of the strike. The actuating part may have, and preferably does, possess additional functions such as providing balance and guidance, and usually it is in the form of a keel.

In the accompanying drawings, there is shown an illustrative embodiment of the invention, from which these and other of its novel features and advantages will be readily apparent.

Figure 2:
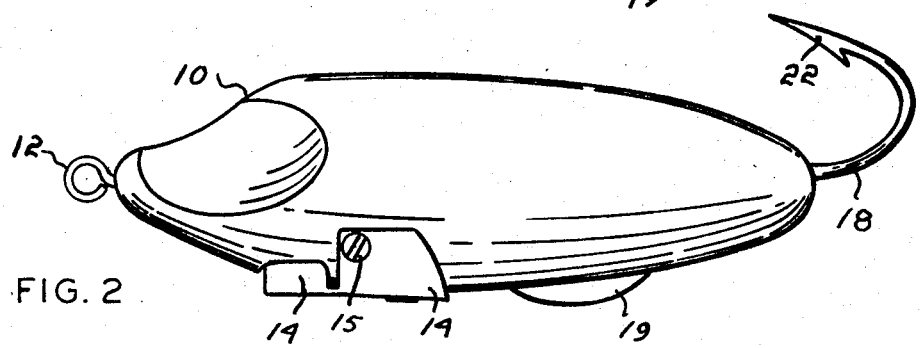
Figure 3:
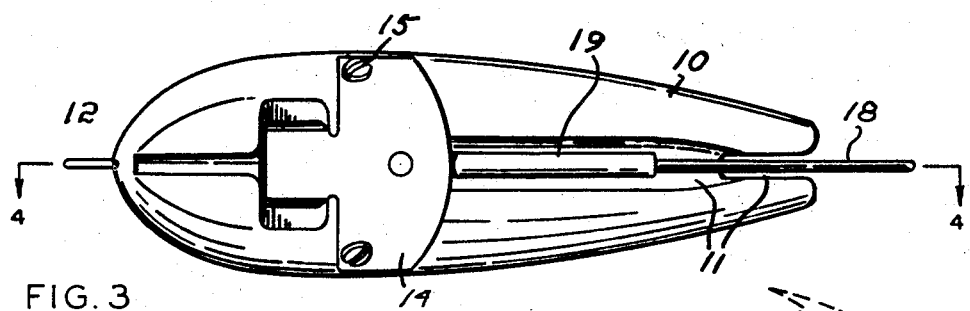
Figure 4:
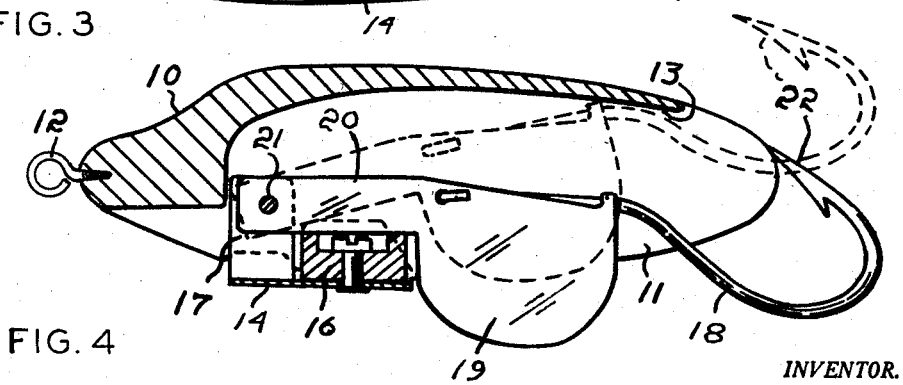

In the drawings:

Fig. 1 is a side elevation, on an increased scale, of a fish lure in accordance with the invention with its hook in its first or shielded position, Fig. 2 is a like view showing the hook in its second or operative position, Fig. 3 is a view of the bottom of the lure, and Fig. 4 is a section taken approximately along the indicated lines 4—4 of Fig. 3.

While the invention is adapted for use with lures having their bodies designed for various different actions in the water, the body 10 is typical in that it is shown as having a longitudinally disposed slot 11 in its under surface commencing rearwardly of its line attaching eye 12 and extending through and dividing the rear end thereof and to provide a stop 13.

In accordance with the invention, a mount 14 is attached, as by screws 15, to the body 10 on opposite sides of the slot 11. The mount 14 has a permanent magnet 16 located to be housed within the body 10 and a pair of similarly located ears 17. The slot 11 is widened whenever necessary to accommodate any of these parts.

A hook 18 includes a part 19 which is preferably a weighted keel and has an arm 20 pivoted at 21 between the ears 17. The arm 20 is of magnetic material and is releasably held by the magnet 16 to establish the first position of the hook shown in Figs. 1 and 4 as one in which the keel part 19 is exposed and the barb 22 of the hook 18 is shielded by the body 10.

While the hook 18 is held in the first position by the magnet 16 during casts and retrieves, the keel 19 is readily detached from the magnet 16 and swung inwardly into the body 10 by a striking fish thus to establish the second position of the hook 18 in which its barb 22 is operatively exposed while its keel part 19 is seated into the slot 11 to an extent determined by the engagement of the hook 18 with the stop 13.

It will thus be apparent that with a lure in accordance with the invention, weeds do not become caught in the hook although the hook becomes immediately operative in the case of a strike. At the same time, the actuating part is adapted to contribute characteristics to the lure, such as balance and guidance, both of which are illustrated by its use as a keel.

What I therefore claim and desire to secure by Letters Patent is:

1. In a fish lure, a body element having a slot at the rear end thereof, a permanent magnet element rigidly attached to said body, and a hook including a barb, a shank and an actuating part intermediate its shank, said hooked being pivotally attached to said body forwardly of said actuating part to swing between first and second positions, in the first position, said shank being exposed intermediate of the body element to be moved into said slot by a striking fish, and the barb of said hook being shielded by said body, in the second position, said shank part being at least partly in said slot and the barb of said hook being operatively exposed, said magnet element being disposed to releasably hold said hook in said first position.

2. In a fish lure, a body element having a slot in its under surface extending to the rear thereof, a permanent magnet element attached to said body, and a hook including a barb and an actuating shank part of sufficient weight and of a form to function as a keel, said hook being pivotally attached to said body forwardly of said actuating part to swing between first and second positions, in the first position, said shank part being exposed to function as a keel and to be moved into said slot by a striking fish, and the barb of said hook being shielded by said body, in the second position, said shank part being at least partly in said slot and the barb of said hook being operatively exposed, said magnet element being disposed to releasably hold said hook in said first position.

3. In a fish lure, a body element having a slot extending to the rear end thereof, a hook mount rigidly attached to the surface of said element transversely of said slot and including a permanent magnet element located within said slot, and a hook including a barb and an actuating shank part, said hook being pivotally attached to said mount forwardly of said actuating part to swing between first and second positions, in the first position, said shank part being exposed to be moved into said slot by a striking fish, and the barb of said hook being shielded by said body, in the second position, said shank part being at least partly in said slot and the barb of said hook being operatively exposed, said magnet element being disposed to releasably hold said hook in said first position.

4. In a fish lure, in combination, a body having a cavity opening through the under surface and through the rear end thereof, a first member attached to said body and at least partly within said cavity, a second member at least partly within said cavity and there joined to said first member and including a keel and a barbed hook, said second member being movable relative to said first member between a first position in which said keel is exposed and said hook is exposed but with its barb shielded by said body and a second position in which said keel enters said cavity, and said hook is operatively exposed, one of said members being at least in part of magnetic stock and a permanent magnet carried by the other of said members and operative to maintain said members releasably in said first position.

References Cited in the file of this patent

UNITED STATES PATENTS

| | | |
|---|---|---|
| 1,069,093 | Faught | July 29, 1913 |
| 2,727,329 | Robinson | Dec. 20, 1955 |